May 18, 1954  J. K. ERZER  2,678,488
METHOD OF MAKING STRUCTURAL MEMBERS
Filed March 22, 1951
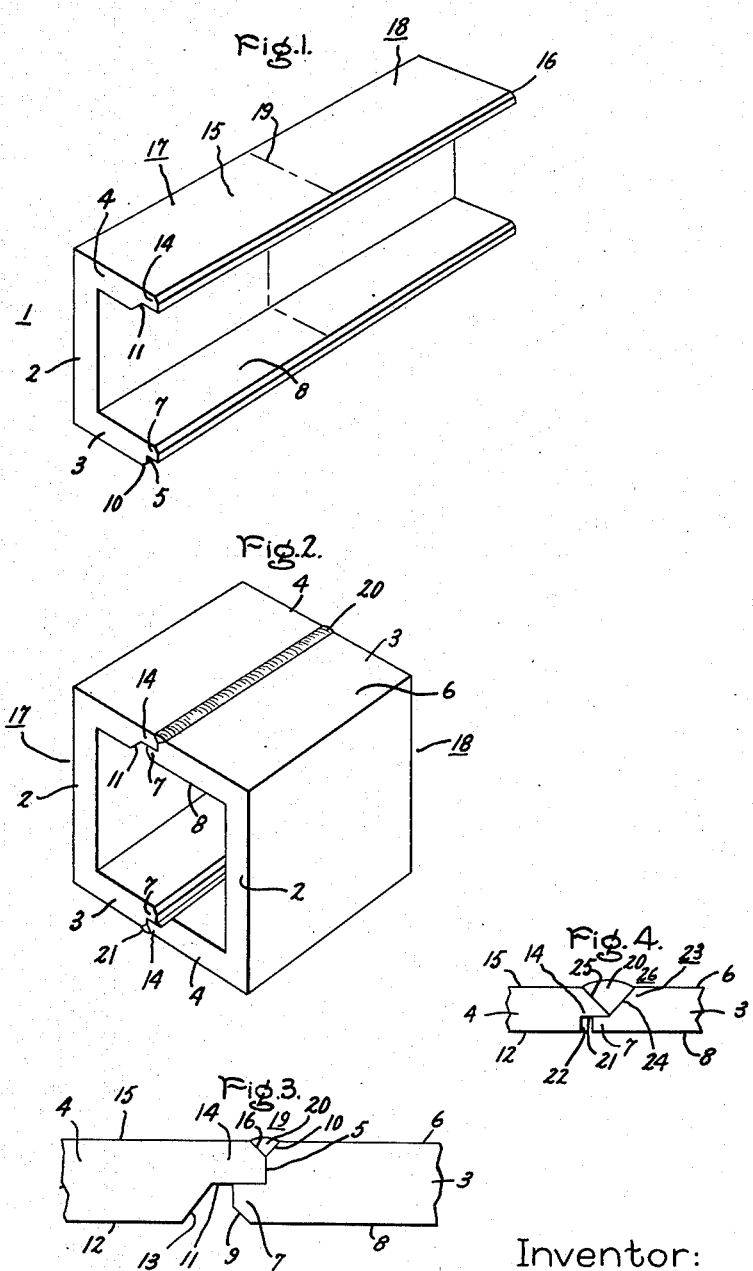
Inventor:
John K. Erzer,
by Ernest C. Britton
His Attorney.

Patented May 18, 1954

2,678,488

UNITED STATES PATENT OFFICE 2,678,488

METHOD OF MAKING STRUCTURAL MEMBERS

John K. Erzer, Erie, Pa., assignor to General Electric Company, a corporation of New York Application March 22, 1951, Serial No. 216,944

4 Claims. (Cl. 29—155)

This invention relates to a method of making a structural member and, more specifically, to a method of fabricating a member having a box section.

In the construction of certain equipment, for example, the side frames of rail vehicle trucks, it may be found desirable to provide a structural member having a box-shaped cross section. Such a member may be fabricated by welding; however, it is difficult to secure a box section which is not distorted due to the welding operation.

An object of this invention is to provide an improved method of making a fabricated member having a box section.

Further objects and advantages of this invention will become apparent by reference to the following description and the accompanying drawing, and the features of novelty which characterize this invention will be pointed out with particularity in the claims annexed to and forming a part of the specification.

This invention in its broadest aspects contemplates the fabrication of a structural member having a box section by providing a channel member, cutting the channel member into two sections, arranging one of the sections with its flanges respectively abutting the flanges of the other section, and finally joining the flanges of the two sections by means of integral connections.

In the drawing, Fig. 1 illustrates the channel member after machining which is used to form the box section of this invention; Fig. 2 illustrates a structural member having a box section fabricated in accordance with this invention utilizing the channel of Fig. 1; Fig. 3 is a fragmentary end view of the joint between the flanges of the two channel sections; and Fig. 4 is a fragmentary end view of a modified form of joint.

Referring now to the drawing, in accordance with this invention, a channel member 1 is provided having a web section 2 and flange portions 3 and 4. The first step in the fabrication of the box section, as most clearly shown in Fig. 3, is to machine the edges of the flanges 3 and 4. Considering the flange 3 first, a longitudinally extending notch 5 is machined in the outer surface 6 of the flange 3 adjacent the outer edge thereof. The notch 5, therefore, defines a longitudinally extending lip 7 on the outer edge of the flange 3 adjacent the inner surface 8. A bevel 9 may also be machined along the outer corner of the lip 7 and another bevel 10 along the outer surface 6.

Considering next the flange 4, a notch 11 is machined in the inner surface 12 adjacent the outer end of the flange 4 and may be provided with a sloping back wall 13. The longitudinally extending notch 11 in the flange 4 defines a longitudinally extending lip 14 on the outer edge of the flange 4 adjacent the outer surface 15 thereof. A beveled edge 16 is also formed on the outer corner of the longitudinally extending lip 14.

When the channel member 1 has been machined as described above, the channel is cut into two sections 17 and 18 along the line 19, as shown in Fig. 1. The section 18 is then turned end for end and arranged as shown in Fig. 2 so that its lips 7 and 14 of the flanges 3 and 4 respectively intermesh with the lips 14 and 7 of the flanges 4 and 3 of the section 17. Thus, lip 14 of flange 4 of section 17 is seated in notch 5 of flange 3 of section 18 and lip 7 of flange 3 of section 18 is seated in notch 11 of flange 4 of section 17. The outer edge of the lip 14 is arranged abutting the base of the notch 5, as shown in Fig. 3, so that the beveled edges 10 and 16 define a V-shaped groove 19. The flanges 3 and 4 of the channel sections 17 and 18 are then joined by forming integral connections, for example, by welding, along the grooves 19, as at 20 and 21. The submerged arc welding method may be utilized to join the flanges 3 and 4 which produces a minimum of distortion. The lips 7 of the flanges 3 of the sections 17 and 18 prevent blowing through of the weld and notching effect and the machining of the flanges, as shown and described, provides the necessary penetration of the weld.

Referring now to Fig. 4, there is shown a modified type of joint in which a longitudinally extending notch 21 having a straight back wall 22 is machined in the inner surface 12 of the flange 4 adjacent the outer end thereof. A longitudinally extending notch 23 having a sloping back wall 24 is machined in the outer surface 6 of the flange 3 adjacent the outer edge thereof. The notch 21 of the flange 4 defines a longitudinally extending lip 14 on the outer edge 15 thereof and the notch 23 of the flange 3 defines a longitudinally extending lip 7 on the inner surface 8. A bevel 25 is formed along the outer corner of the longitudinally extending lip 14, as shown. After the channel member is cut in two, as described above, the flanges are joined as shown with the longitudinally extending lip 14 of flange 4 being arranged in the notch 23 of flange 3 and the lip 7 of flange 3 being arranged in the notch 21 of flange 4. The sloping back wall 24 of the notch 23 and the bevel 25 of flange 4 define a V-shaped groove 26 along which the weld 20 is formed.

It will now be readily apparent that in accordance with this improved method, a single channel member is utilized to form a box section, thereby insuring that the two halves of the section are uniformly dimensioned. Further, the machining is done in a single operation, thereby insuring accurate joints.

While I have shown and described a particular embodiment of this invention, modifications and improvements thereof will occur to those skilled in the art. I desire it to be understood, therefore, that this invention is not limited to the specific form shown and I intend in the appended claims to cover all modifications which do not depart from the spirit and scope of this invention.

What I claim as new and desire to secure by Letters Patent of the United States is:

1. The method of making a fabricated member having a box section comprising providing a channel member, machining in one operation the outer longitudinal edge of one flange of said channel member to form a longitudinal lip adjacent the outer side of said one flange, and the outer longitudinal edge of the other flange of said channel member to form a longitudinal lip adjacent the inner side of said other flange, transversely cutting said channel member in two to provide two channel sections, positioning said two sections with the lips of said flanges respectively intermeshing, and joining said flanges by integral connections along said lips.

2. The method of making a fabricated member, having a box section comprising providing a channel member, machining the outer longitudinal edge of one flange of said channel member to form a longitudinal lip adjacent the outer side of said one flange and to form a bevel on the outer corner of said lip, machining the outer longitudinal edge of the other flange of said channel member to form a longitudinal lip adjacent the inner side of said other flange and to form a bevel on the outer corner of said other flange, transversely cutting said channel member in two to provide two channel sections, positioning said two sections with the lips of said flanges respectively intermeshing and with said bevels defining grooves, and joining said flanges by forming integral connections along said grooves.

3. The method of making a fabricated member having a box section with closed side portions comprising providing a channel member, forming a longitudinal notch in the inner surface of one of the flanges of said channel member adjacent the outer edge thereof, said notch defining a longitudinal lip on the outer edge of said one flange adjacent the outer surface thereof, forming a longitudinal notch in the outer surface of the other flange of said channel member adjacent the outer edge thereof, said notch defining a longitudinal lip on the outer edge of said other flange adjacent the inner surface thereof, transversely cutting said channel member in two providing two channel sections, positioning one of said channel sections with its flange lips respectively seated in the notches in the flanges of the other of said sections so that the lips of said flanges respectively intermesh along the entire length of said lips, and joining said flanges by integral connections on the outer surfaces thereof.

4. The method of making the fabricated member having a box section with closed side portions comprising providing a channel member, forming a longitudinal notch having a straight back side in the inner surface of one of the flanges of said channel member adjacent the outer edge thereof, said notch defining a longitudinal lip on the outer edge of said one flange adjacent the outer surface thereof, forming a bevel on the outer edge of said last-mentioned longitudinal lip, forming a longitudinal notch having a sloping back side in the outer surface of the other flange of said channel member adjacent the outer edge thereof, said notch defining a longitudinal lip on the outer edge of said other flange adjacent the inner surface thereof, transversely cutting said channel member in two providing two channel sections, positioning one of said channel sections with its flange lips respectively seated in the notches in the flanges of the other of said sections so that the lips of said flanges respectively intermesh, said sloping back sides of said outer notches and said bevels of said first-mentioned lips defining V-shaped longitudinally extending grooves along the entire length of said box section, and joining said flanges by forming integral connections along said grooves, whereby a closed surface is obtained at said side portions.

References Cited in the file of this patent
UNITED STATES PATENTS

| Number | Name | Date |
|---|---|---|
| 447,077 | Middleton | Feb. 24, 1891 |
| 1,644,940 | Moyer | Oct. 11, 1927 |
| 1,934,064 | Hermanson et al. | Nov. 7, 1933 |
| 1,935,063 | Scott | Nov. 14, 1933 |
| 2,245,789 | Klavik | June 17, 1941 |
| 2,363,828 | Anderson | Nov. 28, 1944 |